United States Patent
Beigel (10) Patent No.: US 6,422,626 B1
(45) Date of Patent: Jul. 23, 2002

(54) INTERIOR EXPANDABLE WARDROBE FOR TRUCK CABS

(75) Inventor: David J. Beigel, Kettering, OH (US)

(73) Assignee: International Truck and Engine Corporation Canada, Warrenville, IL (US)

(*) Notice: Subject to any disclaimer, the term of this patent is extended or adjusted under 35 U.S.C. 154(b) by 0 days.

(21) Appl. No.: 09/692,680

(22) Filed: Oct. 19, 2000

Related U.S. Application Data (60) Provisional application No. 60/160,963, filed on Nov. 18, 1999.

(51) Int. Cl.$^7$ .................................................. B60R 7/04
(52) U.S. Cl. ........................ 296/24.1; 52/70; 312/262; 312/349
(58) Field of Search ................................ 296/24.1, 156, 296/164; 312/262, 349, 258, 249.1; 52/70

(56) References Cited

U.S. PATENT DOCUMENTS

| | | | | |
|---|---|---|---|---|
| 498,804 A | * | 6/1893 | Manning | 312/262 |
| 1,828,642 A | * | 10/1931 | Bunker | 52/70 |
| 3,210,143 A | * | 10/1965 | Frederick | 312/349 X |
| 3,294,464 A | * | 12/1966 | Lew | 312/258 |
| 3,458,242 A | * | 7/1969 | Williams | 312/258 |
| 4,336,973 A | * | 6/1982 | Bae | 312/262 X |
| 4,550,946 A | * | 11/1985 | Hanemaayer | 296/156 |
| 5,468,061 A | * | 11/1995 | Fries et al. | 312/258 |

FOREIGN PATENT DOCUMENTS

| | | | | |
|---|---|---|---|---|
| FR | 639816 | * | 6/1928 | 312/258 |
| GB | 186832 | * | 10/1922 | 312/258 |

* cited by examiner

Primary Examiner—Dennis H. Pedder
(74) Attorney, Agent, or Firm—Jeffrey P. Calfa; Neil T. Powell; Dennis Kelly Sullivan (57) ABSTRACT

An expandable wardrobe for location along an interior wall of a truck cab passengers pace is provided by incorporating into the cab an anchor wall having two vertical edges, the anchor wall being positionally fixed against the vehicle interior wall and providing a back wall to the wardrobe. A pair of opposed sidewalls are provided with each sidewall having two vertical edges, and each of the pair of opposed sidewalls being hingedly mounted along one vertical edge to a different vertical edge of the anchor wall, leaving one vertical edge of each of the opposed sidewalls free. A freewall is hingedly mounted between the free vertical edges of each of the pair of opposed sidewalls to enclose a variably sized space. A doorway through the free wall into the variably sized space provides access to the space.

10 Claims, 7 Drawing Sheets

INTERIOR EXPANDABLE WARDROBE FOR TRUCK CABS

REFERENCE TO RELATED APPLICATION

This application claims the benefit of U.S. Provisional Application No. 60/160,963, filed Nov. 18, 1999 which application is incorporated herein in its entirety.

FIELD OF THE INVENTION

The present invention relates generally to structures providing expandable storage space on vehicles and more particularly to an expandable wardrobe or closet install able in an operator's extended cab on a truck.

BACKGROUND OF THE INVENTION

Truck cabs, even the now popular extended cabs, have limited interior space to accommodate driver, passengers, luggage and sleeping quarters. Many features designed to add to the comfort of driver and passengers compete for the limited available space.

Within the limited space available, truck cab interior layouts maximize the use of available space. The allocation of space to one use has necessarily prevented use of the same space for other purposes. For example, if space has been used for a closet or wardrobe, there is less space for a sleeping compartment or other features. In addition, it is difficult to anticipate user preferences regarding the allocation of space in the cab interior. Some drivers desire extra closet space, while others want more sleeping space. Indeed, user requirements may change from trip to trip depending on the demands of a particular journey. From one trip to the next the user may need more, or less, space.

Accordingly, there is need for increased flexibility in the allocation of truck interior space, which is under the control of the end user. There is a need for example, for a closet or wardrobe which can be adjusted in size depending upon demand.

SUMMARY OF THE INVENTION

According to the invention there is provided an expandable wardrobe for location along an interior wall of a vehicle passenger space. The expandable wardrobe comprises an anchor wall having two vertical edges, the anchor wall being positionally fixed against the vehicle interior wall and providing a back wall to the wardrobe. A pair of opposed sidewalls are provided with each sidewall having two vertical edges, and each of the pair of opposed sidewalls being hingedly mounted along one vertical edge to a different vertical edge of the anchor wall, leaving one vertical edge of each of the opposed sidewalls free. A free wall is hingedly mounted between the free vertical edges of each of the pair of opposed sidewalls to enclose a variably sized space. A doorway through the free wall into the variably sized space provides access to the space.

While the preferred use of the enclosed space is for a wardrobe or closet, other uses for such an enclosed space are conceivable, such as an enclosure for a temporary shower. Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
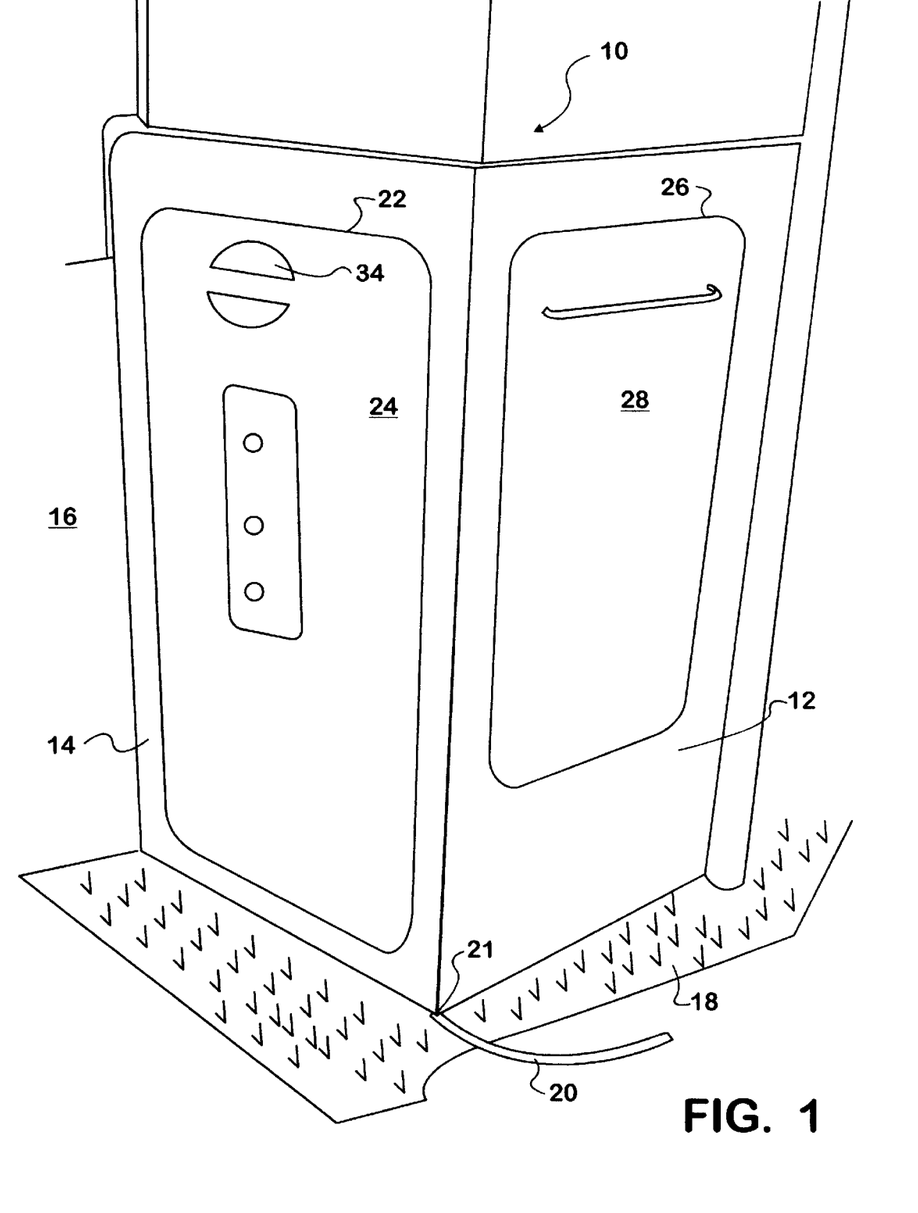
FIG. 1 is a front perspective view of the expandable wardrobe or closet of the present invention in a compressed state according to the present invention.
Figure 2:
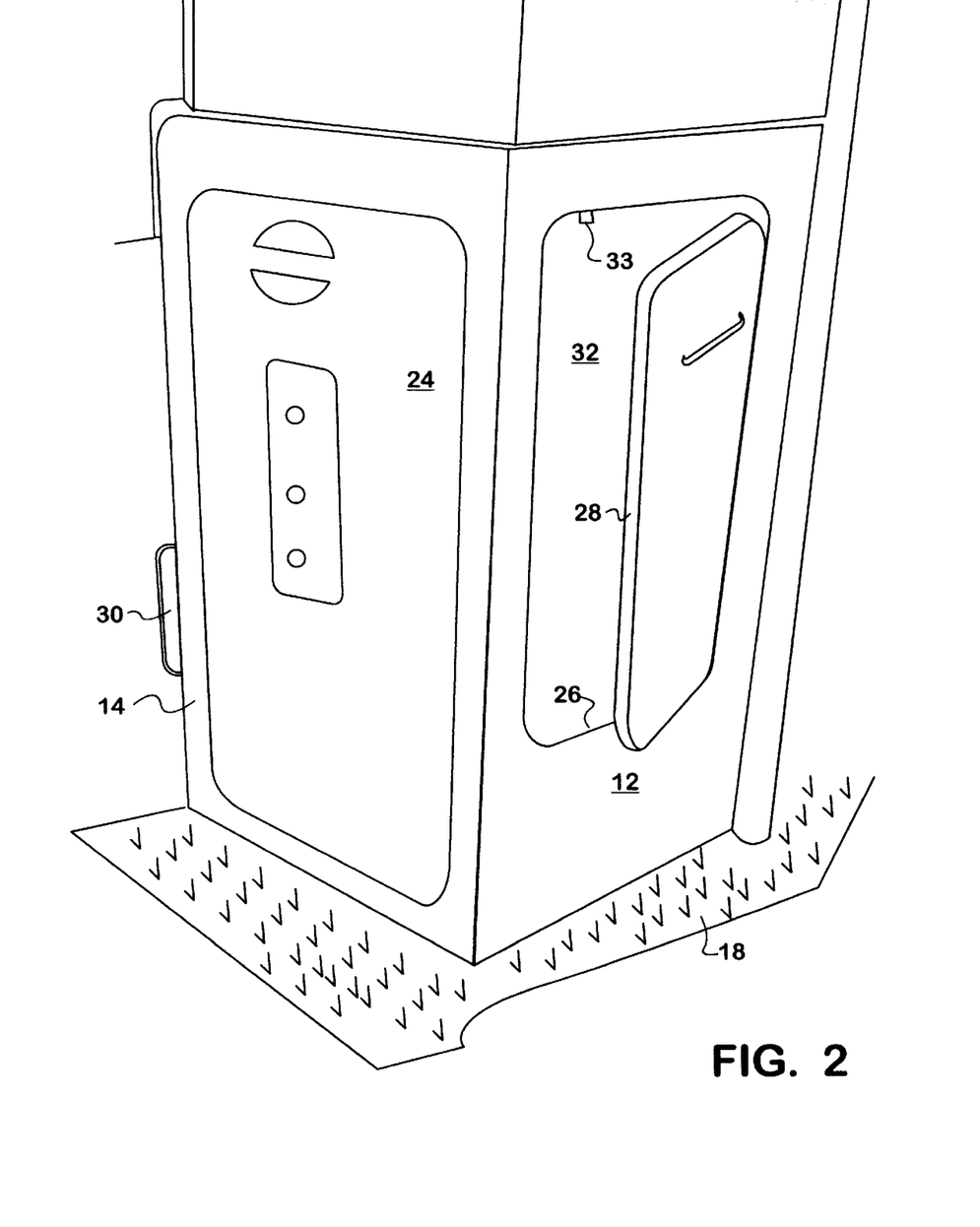
FIG. 2 is a front perspective view of the expandable wardrobe in a compressed state illustrating an opened door in an exterior sidewall or panel.

Referring now to the drawings and particularly to FIGS. 1 and 2, an expandable closet or wardrobe 10, particularly suited for employment in a sleeping compartment of a truck cab, is illustrated in a compacted state. Wardrobe 10 may be arranged in the shape of a parallelogram or rectangle, or folded essentially flat against an interior wall 16 of the truck cab depending upon the preferences of the vehicle operator or passengers and the layout of the truck interior. This is effected by attaching the four walls of the wardrobe 10 to each other by hinges running along the vertical edges of the walls, as described below. While the preferred embodiment of wardrobe 10 is employed in truck cabs, other embodiments may be adapted for use in motor homes, cabin boats, and similar vehicles and craft where interior, habitable space is at a premium. While described for use as a wardrobe 10, the wardrobe may be configured and used for any purpose made convenient through a temporary partitioning of space, such as for a shower stall.

Wardrobe 10 is constructed from four panels or walls, including an exterior sidewall 12 and a front wall 14. The reference to walls 12 and 14 respectively as exterior side and front walls is made with reference to their position relative to the supporting base provided by interior wall 16 of the truck cab. The interior space enclosed by the walls of wardrobe 10 is accessible by opening doors 24 and 28 mounted in doorways 22 and 26, respectively. Doorways 22 and 26 pass through front wall 14 and exterior sidewall 12, respectively, to the interior space enclosed by wardrobe 10. A vent 34 may also be provided in a door to promote circulation of air.

In the present, preferred embodiment, wardrobe 10 is positioned in a nook formed by a shallow S-curve shaped interior wall 16, with the position chosen to avoid interference with any other interior obstructions such as upright support posts. Pawls may extend from the bottom or top of the walls to cooperate with channels set in the deck or ceiling of the passenger space. As illustrated in FIG. 1, an optional pawl 21 may extend from the bottom sidewall 12 to act as a guide in channel 20 formed in the floor or deck 18 of the passenger space. When closed doors 24 and 28 may be held in place by magnetic catches such as catch 33 mounted behind doorway 26.

Figure 3:
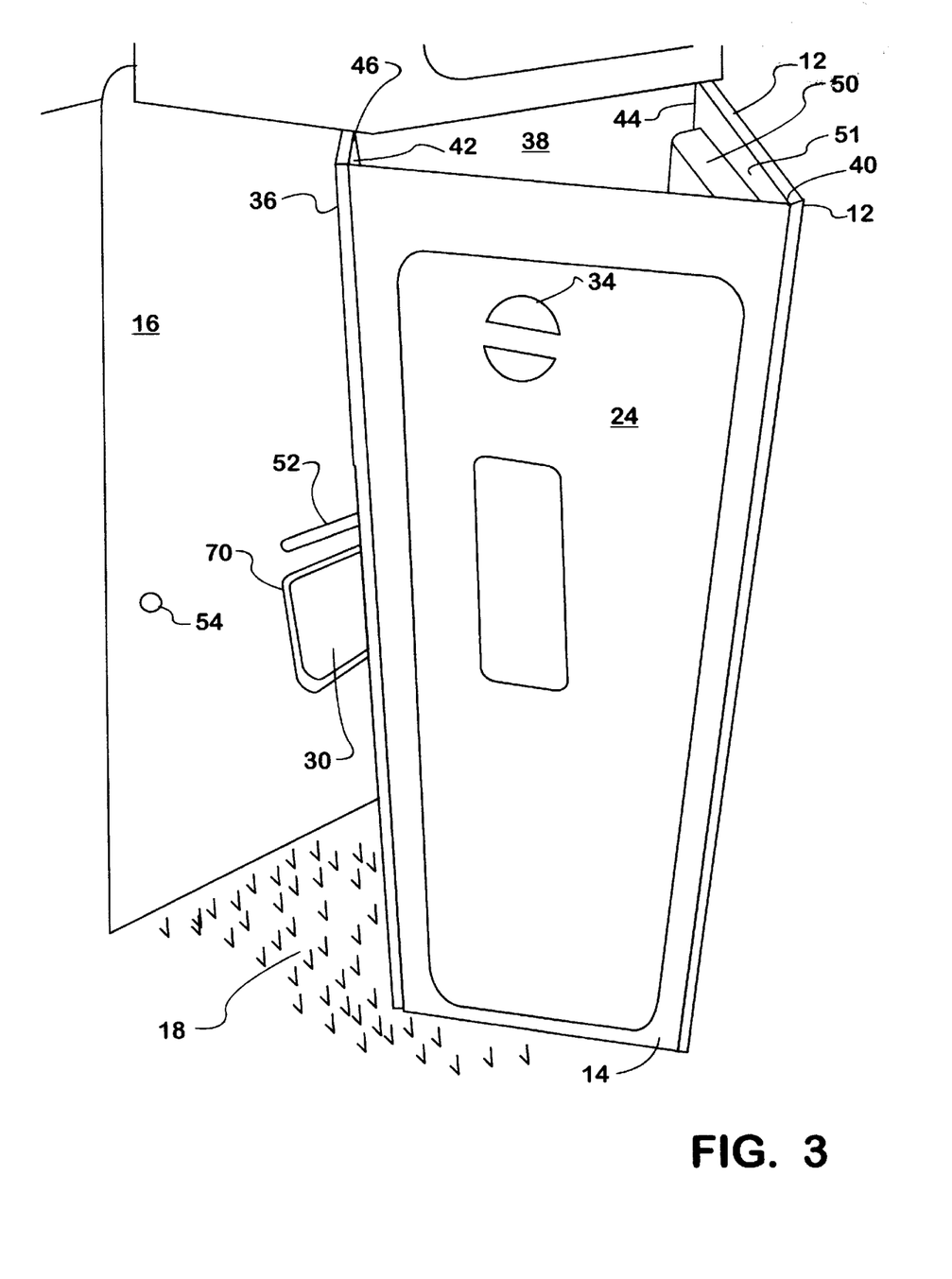
FIG. 3 is a front perspective view of the expandable wardrobe in an expanded state.
Figure 4:
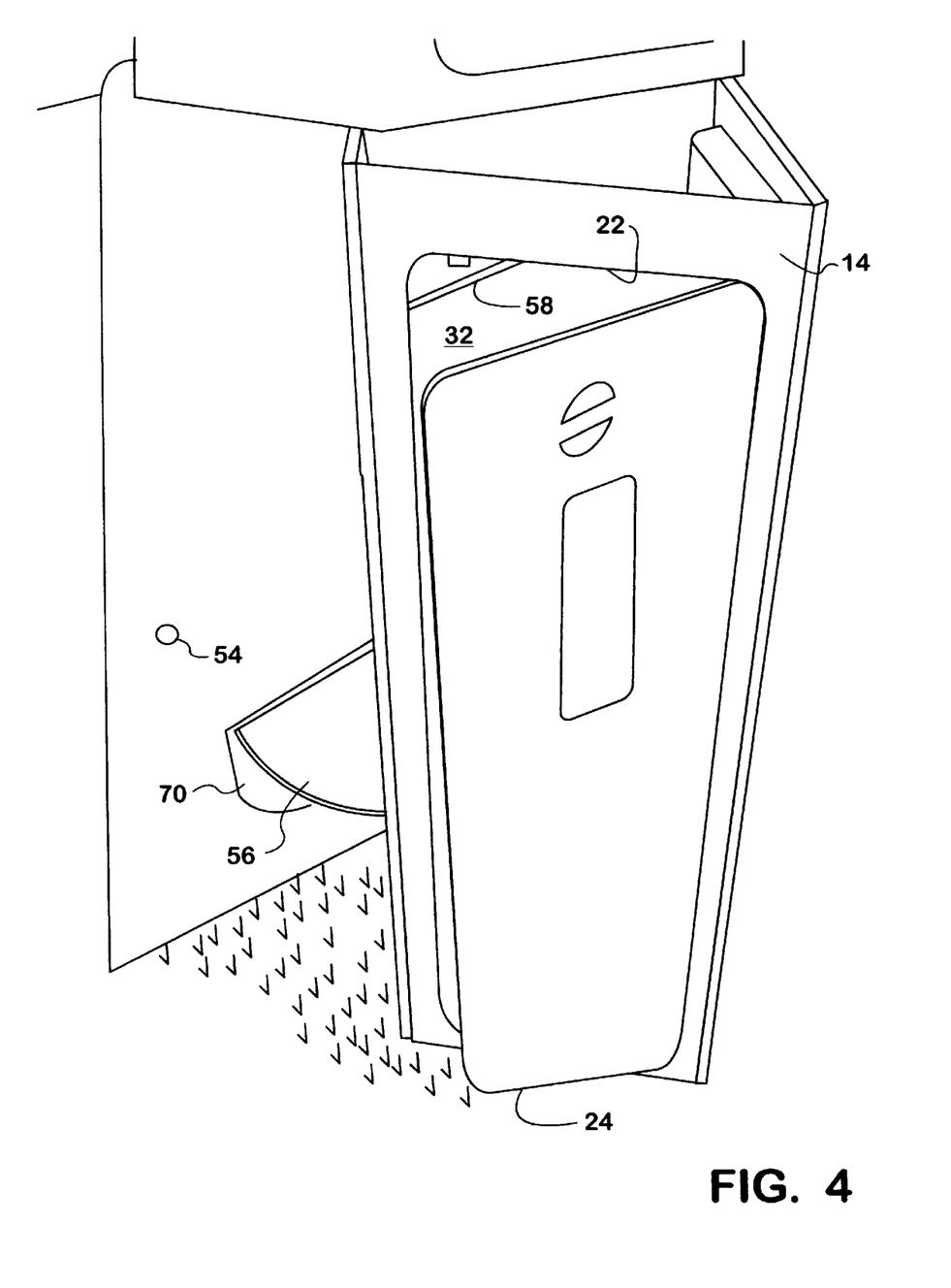
FIG. 4 is a front perspective view of the expandable wardrobe in an expanded state with an opened door in a front wall or panel.

Referring now to FIGS. 3 and 4, wardrobe 10 is illustrated expanded to its maximum extent with the walls or panels positioned at right angles with respect to each adjacent wall or panel. As mentioned above, wardrobe 10 is constructed from four panels, which include a back or support wall 38, exterior sidewall 12, front wall 14, and an interior sidewall 36. In some applications, the function of back wall 38 may be filled by interior wall 16. Four vertical hinges 44, 40, 42 and 46 are located in the interior of each of the four vertices of the enclosed space 32, formed at the intersections of the walls 38, 12, 14, and 36 and attach adjacent walls to each other along the vertical edges of the walls.

Back wall 38 may be horizontally movable along interior wall 16, in which case a channel 52 may be provided in interior wall 16 for cooperation with a guides (not shown) extending from the face of back wall 38 facing the interior wall, preferably at or adjacent vertical hinges 46 and 44. In other embodiments, including where interior wall 16 provides a back wall for wardrobe 10, no channel 52 would be provided. Where interior wall 16 provides a support surface, hinges 46 and 44 would be attached directly to the interior wall, spaced from one another to match the spacing between hinges 42 and 40. A magnetic latch 54 is set into interior wall 16 and cooperates with a magnetic latch set in interior sidewall 36 to hold wall 36 against interior wall when the wardrobe 10 is positioned in its compacted state. If interior wall 16 is flat, positioning sidewall 36 against the interior sidewall 16 will completely fold wardrobe 10. Here, where interior wall 16 forms a gentle S-curve, positioning sidewall 36 against interior wall 16 positions wardrobe 10 in the shape of a parallelogram.

Partially obscured in FIG. 3 is a table or shelf brace 30, set in a recess 70 in interior wall 16. In FIG. 4 the shelf brace 30 is moved upwardly to a position parallel to deck 18 providing a brace for holding wardrobe 10 in an expanded position, usually with the walls forming a rectangle. Shelf 30 is preferably shaped to accommodate wardrobe 10 when expanded to enclose the maximum internal volume.

Backwall 38 may be horizontally movable along interior wall 16, in which case a channel 52 may be provided in interior wall 16 for cooperation with guides 146 and 144 (shown in FIG. 6A) extending from the face of backwall 38 facing the interior wall, preferably at or adjacent vertical hinges 46 and 44. In other embodiments, including where interior wall 16 provides a backwall for wardrobe 10 no channel 52 would be provided. Where interior wall 16 provides a support surface, hinges 46 and 44 would be attached directly to the interior wall, spaced from one another to match the spacing between hinges 42 and 40. A magnetic latch 54 is set into interior wall 16 and cooperates with a magnetic latch set in interior sidewall 36 to hold wall 3G against interior wall when the wardrobe 10 is positioned in its compacted state. If interior wall 16 is flat, positing sidewall 36 against the interior sidewall 16 will completely fold wardrobe 10. Here, where interior wall 16 forms a gentle S-curve, positioning sidewall 36 against interior wall 16 positions wardrobe 10 in the shape of a parallelogram.

Door 24 may be opened to gain access to interior space 32 through doorway 22 in front wall 14. Rods 58 positioned in the interior space 32 may be raised to brace the position of wardrobe 10 in its expanded state. A special garment bag 50 adapted for use with wardrobe 10 hangs from the interior face 51 of exterior wall 12.

Figure 5:
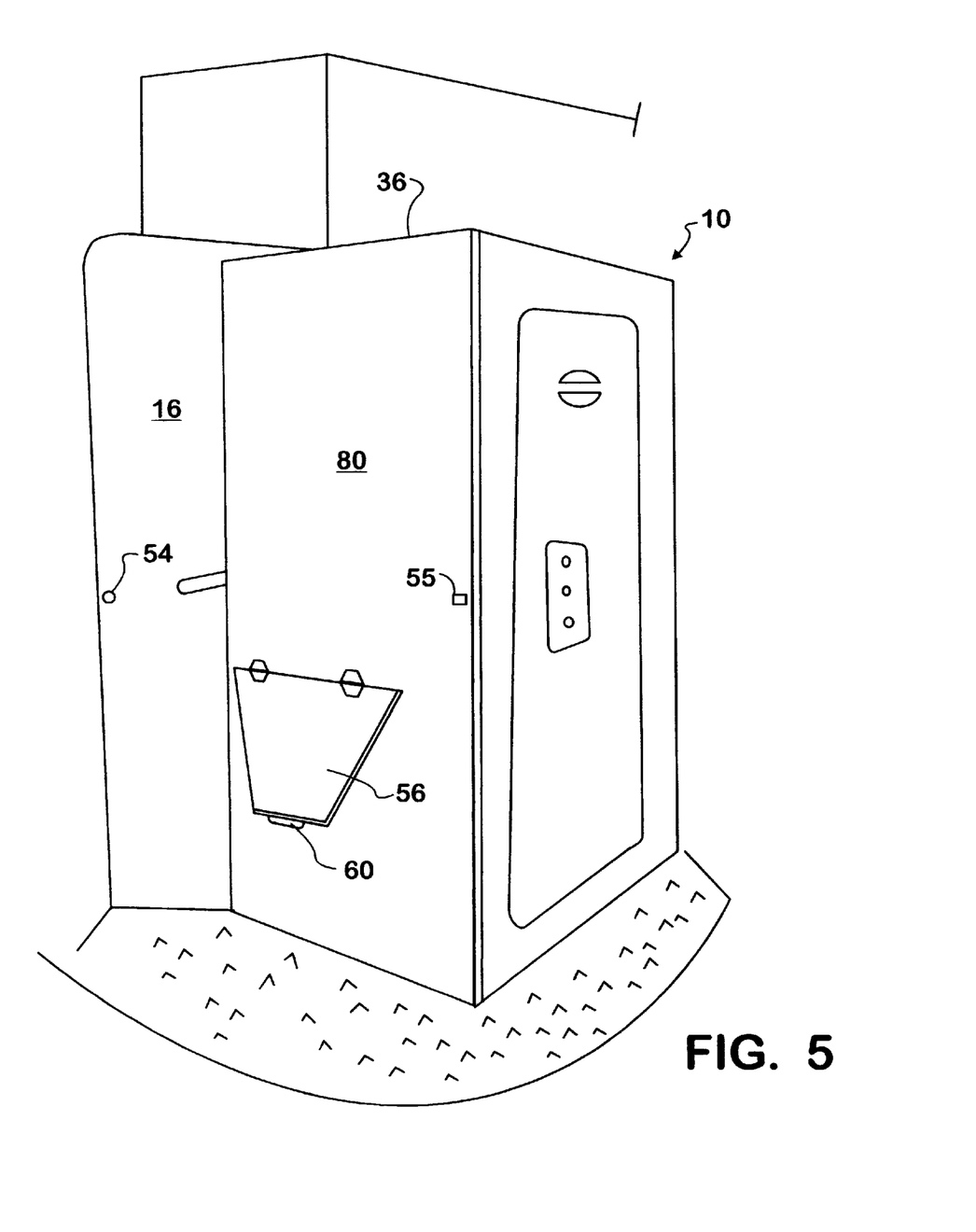
FIG. 5 is a perspective view of the expandable wardrobe showing one embodiment featuring an interior sidewall or panel.

FIG. 5 illustrates an exterior face 80 of interior sidewall 36 pivoted away from interior wall 16. An alternative rest position for a shelf brace 56, nestled in a recess 60 into sidewall 36, is illustrated. A magnetic catch 55 is positioned along the vertical edge of sidewall 36 distal to the pivot support anchored along interior wall 16 and in a position to cooperate with magnetic latch 54 which is set in the interior wall 16. By anchored it is meant that the pivot point may be positionally fixed or that it can move along the interior wall 16 (in some embodiments) but not away from the wall.

Figure 6A:
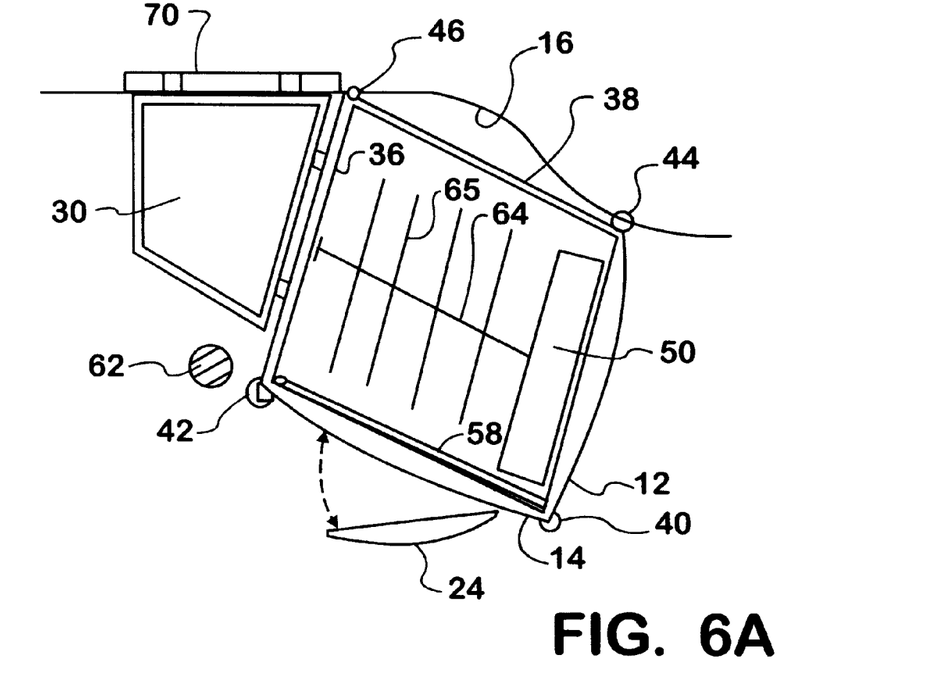
FIGS. 6A–B are top schematic views of the expandable wardrobe in an expanded state and a compressed state.
Figure 6B:
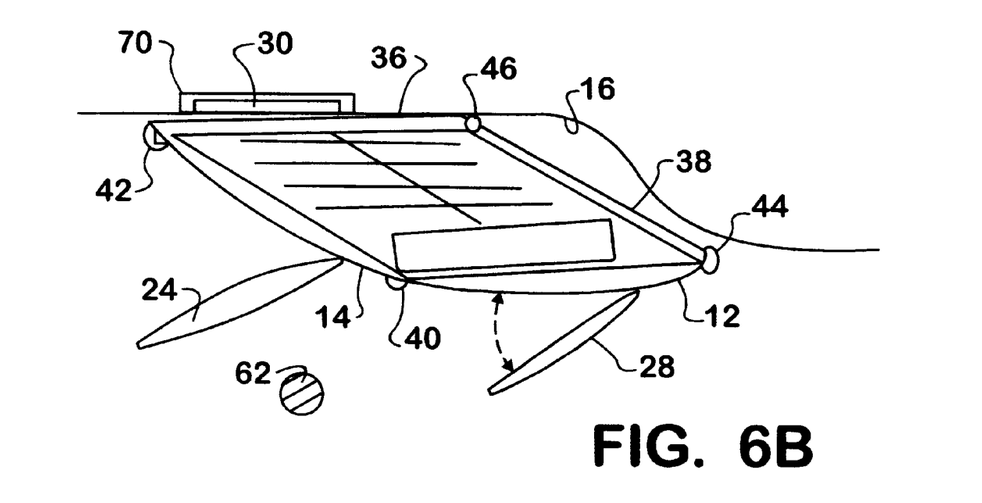

FIGS. 6A–B illustrate schematically the positioning of the walls (including a distinct backwall 38) of wardrobe 10 along side and attached to an S-curve shaped interior wall 16. Wardrobe 10 is positioned to avoid impingement on a vertical post 62 which is part of the interior support structure of an extended sleeper cab attached to the back of a truck cab. Opposed walls of wardrobe 10 are parallel in all positions, implying that sidewalls 12 and 36 are of equal width and that front wall 14 is equal in width to backwall 38, or that hinges 46 and 44 are mounted on wall 16 equidistant to the spacing between hinges 42 and 40. The wardrobe 10 may even be connected to interior wall 16 at only either of the pivots associated with hinges 44 or 46.

In the present embodiment, backwall 38 is mounted to interior wall 16 adjacent hinges 46 and 44. In an alternative embodiment guides extending from the backwall 16 may cooperate with a channel in interior wall 16 allowing wardrobe 10 to be repositioned along the wall. The remaining three walls may be pulled outwardly from interior wall 16 to bring sidewalls 12 and 36 to positions perpendicular to the backwall 38, as illustrated in FIG. 6A. Shelf 30 may then be positioned as a brace between interior wall 16 and interior sidewall 36. Rod 58 may be positioned between two walls to lock the wardrobe 10 in its expanded state. A garment bag 50 is illustrated hung from sidewall 12 inside the enclosed space with a hanger rod 64 folded out and attached to the opposite sidewall 36. When wardrobe 10 is collapsed, rod 64 rotates about a vertical axis and individual hangers 65 rotate on the rod under the influence of the sidewalls and each other. Table 30 is lowered on hinges into a recess 70. Doors 24 and 28 are illustrated folded outwardly to show clearance from post 62.

FIGS. 6A–B illustrate schematically the positioning of the walls (including a distinct backwall 38) of wardrobe 10 along side and attached to an Scurve shaped interior wall 16. Wardrobe 10 is positioned to avoid impingement on a vertical post 62 which is part of the interior support structure of an extended sleeper cab attached to the back of a truck cab. Opposed walls of wardrobe 10 are parallel in all positions, implying that sidewalls 12 and 36 are of equal width and that front wall 14 is equal in width to backwall 38, or that hinges 46 and 44 are mounted on wall 16 equidistant to the spacing between hinges 42 and 40. The wardrobe 10 may even be connected to interior wall 16 at only either of the pivots associated with hinges 44 or 46. Guides 144 and 146 may be provided extending inwardly from hinges 44 and 46 respectively, engaging channel 52 and thereby allowing backwall 38 to be moved along the interior wall 16.

Figure 7A:
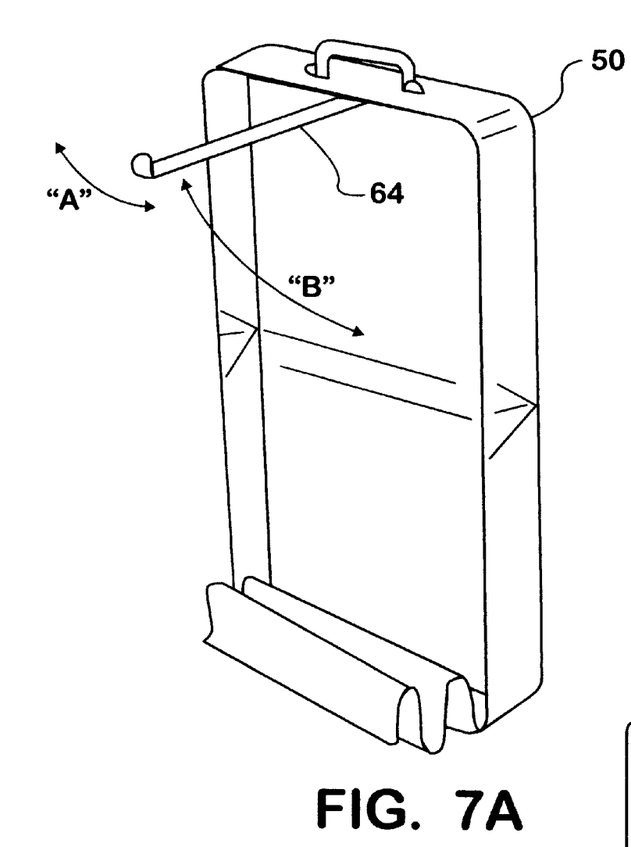
FIGS. 7A–B illustrate a garment bag adapted for use in the expandable wardrobe of the present invention.
Figure 7B:
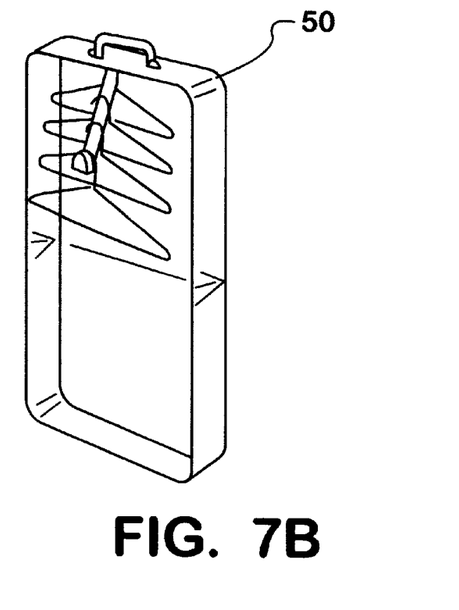

FIGS. 7A–B better illustrate garment bag 50, illustrating that rod 64 can be both twisted in the directions indicated by the double headed arrow A, but lowered and raised as indicated by the double headed arrow B.

The present invention provides for easy user configuration of a space enclosure in the cramped confines of the interior of a truck cab. Configurations are possible which occupy no more space than the minimum space required to store the structure, and an expanded form particularly useful as a closet.

While the invention is shown in only one of its forms, it is not thus limited but is susceptible to various changes and modifications without departing from the spirit and scope of the invention. The invention is not limited to the specific details, application, representative devices, and illustrated examples in this description.

What is claimed is:

1. A vehicle passenger space, comprising:

an interior wall to the vehicle passenger space;

an anchor wall having two vertical edges, the anchor wall being mounted with respect to the interior wall to lie substantially flat against the interior wall;

a pair of opposed sidewalls each having two vertical edges, each of the pair of opposed sidewalls being hingedly mounted along one vertical edge to a different vertical edge of the anchor wall leaving one vertical edge of each of the opposed sidewalls free;

a recess in the interior wall;

an external two position shelf position able in the recess for storage and extend able to a position between the recess and a first of said side walls for bracing the side wall against movement when extended away from the interior wall;

a free wall hingedly mounted between the free vertical edges of each of the pair of opposed sidewalls to enclose a variably sized space; and a door way through the free wall into the variably sized space.

2. A vehicle passenger space as set forth in claim 1, further comprising:

a track located along the interior wall; and the anchor wall being mounted in the track for horizontal movement along the track and the interior wall.

3. A vehicle passenger space as set forth in claim 1, further comprising:

a first door hingedly mounted in the door way;

a second door way into the enclosed space through a second of said sidewalls; and a second door hingedly mounted in the second doorway.

4. Apparatus for enclosing a variably sized space, the apparatus comprising:

a base wall;

a support depending from and horizontally position able along the base wall, the support having two vertically oriented, horizontally spaced hinge mounts located adjacent the base wall;

a pair of sidewalls, each having two parallel vertical edges, and each being mounted along one vertical edge to a different one of the two vertically oriented, horizontally spaced hinge mounts, leaving a free distal edge with respect to the hinge mount for each of the pair of parallel, spaced sidewalls; and a front panel rigid closure hingedly connected to each of the distal edges holding the sidewalls in a parallel relationship and completing an enclosure; and an external shelf hingedly mounted to a first of the pair of sidewalls outside the enclosure and extend able to brace the sidewall from the base wall.

5. Apparatus as claimed in claim 4, further comprising:

a doorway through the front panel; and a door hingedly positioned in the doorway through the front panel.

6. Apparatus as claimed in claim 5, further comprising:

a doorway through a second of the pair of sidewalls; and a door hingedly mounted in the doorway in the second sidewall.

7. Apparatus as claimed in claim 6, further comprising:

a position able hanger rod extending from one of the pair of sidewalls toward the other of the pair of sidewalls and position able in at least two angles from the vertical to fit the enclosed space in various states of extension.

8. Apparatus as claimed in claim 7, further comprising:

a recess in the base wall for receiving the external shelf when flat against the sidewall and the sidewall is brought into close proximity to the base wall; and cooperating means mounted to the first sidewall and the base wall for reasonably retaining the first sidewall against the base wall.

9. Apparatus as claimed in claim 7, wherein the support includes a back wall.

10. Apparatus as claimed in claim 9, further comprising:

a track positioned along the basewall; and guides extending from the back wall into engagement with the track allowing the apparatus to be moved laterally along the support wall.

* * * * *